US008280120B2

(12) United States Patent
Hoyos et al.

(10) Patent No.: US 8,280,120 B2
(45) Date of Patent: Oct. 2, 2012

(54) FRAUD RESISTANT BIOMETRIC FINANCIAL TRANSACTION SYSTEM AND METHOD

(75) Inventors: Hector T. Hoyos, New York, NY (US); Keith J. Hanna, New York, NY (US)

(73) Assignee: Eyelock Inc., Caguas, PR (US)

( * ) Notice: Subject to any disclaimer, the term of this patent is extended or adjusted under 35 U.S.C. 154(b) by 853 days.

(21) Appl. No.: 12/444,018

(22) PCT Filed: Oct. 2, 2007

(86) PCT No.: PCT/US2007/080135
§ 371 (c)(1),
(2), (4) Date: Apr. 2, 2009

(87) PCT Pub. No.: WO2008/042879
PCT Pub. Date: Apr. 10, 2008

(65) Prior Publication Data
US 2010/0014720 A1 Jan. 21, 2010

Related U.S. Application Data

(60) Provisional application No. 60/827,738, filed on Oct. 2, 2006.

(51) Int. Cl.
*G06K 9/00* (2006.01)
(52) U.S. Cl. ....... 382/117; 382/124; 340/5.53; 340/5.83
(58) Field of Classification Search .................. 382/117, 382/124; 340/5.53, 5.83
See application file for complete search history.

(56) References Cited

U.S. PATENT DOCUMENTS

| | | | |
|---|---|---|---|
| 5,613,012 | A | 3/1997 | Hoffman et al. |
| 5,615,277 | A | 3/1997 | Hoffman |
| 5,737,439 | A | 4/1998 | Lapsley et al. |
| 5,764,789 | A | 6/1998 | Pare et al. |
| 5,802,199 | A | 9/1998 | Pare et al. |
| 5,805,719 | A | 9/1998 | Pare et al. |
| 5,838,812 | A | 11/1998 | Pare et al. |
| 5,901,238 | A | 5/1999 | Matsushita |
| 5,953,440 | A | 9/1999 | Zhang et al. |
| 5,978,494 | A | 11/1999 | Zhang |
| 6,021,210 | A | 2/2000 | Camus et al. |
| 6,028,949 | A | 2/2000 | McKendall |
| 6,064,752 | A | 5/2000 | Rozmus et al. |
| 6,069,967 | A | 5/2000 | Rozmus et al. |
| 6,144,754 | A | 11/2000 | Okano et al. |
| 6,192,142 | B1 | 2/2001 | Pare et al. |
| 6,289,113 | B1 | 9/2001 | McHugh et al. |
| 6,366,682 | B1 | 4/2002 | Hoffman et al. |
| 6,373,968 | B2 | 4/2002 | Okano et al. |
| 6,377,699 | B1 | 4/2002 | Musgrave et al. |
| 6,424,727 | B1 | 7/2002 | Musgrave et al. |
| 6,483,930 | B1 | 11/2002 | Musgrave et al. |
| 6,532,298 | B1 | 3/2003 | Cambier et al. |
| 6,542,624 | B1 | 4/2003 | Oda |
| 6,546,121 | B1 | 4/2003 | Oda |

(Continued)

*Primary Examiner* — John Strege
(74) *Attorney, Agent, or Firm* — John D. Lanza; Foley and Lardner LLP

(57) ABSTRACT

A method and system for authenticating financial transactions is disclosed wherein biometric data is acquired from a person and the probability of liveness of the person and probability of a match between the person or token and known biometric or token information are calculated, preferably according to a formula $D=P(p)*(K+P(m))$, wherein K is a number between 0.1 and 100, and authenticating if the value of D exceeds a predetermined value.

21 Claims, 4 Drawing Sheets

U.S. PATENT DOCUMENTS

| | | | |
|---|---|---|---|
| 6,594,376 | B2 | 7/2003 | Hoffman et al. |
| 6,594,377 | B1 | 7/2003 | Kim et al. |
| 6,700,998 | B1 | 3/2004 | Murata |
| 6,760,467 | B1 | 7/2004 | Min et al. |
| 6,850,631 | B1 | 2/2005 | Oda et al. |
| 6,917,695 | B2 | 7/2005 | Teng et al. |
| 6,980,670 | B1 | 12/2005 | Hoffman et al. |
| 6,985,608 | B2 | 1/2006 | Hoffman et al. |
| 7,146,027 | B2 | 12/2006 | Kim et al. |
| 7,248,719 | B2 | 7/2007 | Hoffman et al. |
| 7,418,115 | B2 | 8/2008 | Northcott et al. |
| 7,428,320 | B2 | 9/2008 | Northcott et al. |
| 7,492,928 | B2 * | 2/2009 | Hillhouse ............... 382/124 |
| 7,505,613 | B2 * | 3/2009 | Russo ............... 382/124 |
| 7,542,590 | B1 | 6/2009 | Robinson et al. |
| 7,558,406 | B1 | 7/2009 | Robinson et al. |
| 7,558,407 | B2 | 7/2009 | Hoffman et al. |
| 7,574,021 | B2 | 8/2009 | Matey |
| 7,606,401 | B2 | 10/2009 | Hoffman et al. |
| 7,616,788 | B2 | 11/2009 | Hsieh et al. |
| 7,693,307 | B2 | 4/2010 | Rieul et al. |
| 7,715,595 | B2 | 5/2010 | Kim et al. |
| 7,869,627 | B2 | 1/2011 | Northcott et al. |
| 8,009,876 | B2 | 8/2011 | Kim et al. |
| 8,170,295 | B2 | 5/2012 | Fujii et al. |
| 2005/0084137 | A1 | 4/2005 | Kim et al. |
| 2007/0211922 | A1 | 9/2007 | Crowley et al. |
| 2009/0074256 | A1 | 3/2009 | Haddad |
| 2009/0097715 | A1 | 4/2009 | Cottard et al. |
| 2010/0021016 | A1 | 1/2010 | Cottard et al. |
| 2010/0074477 | A1 | 3/2010 | Fujii et al. |
| 2010/0246903 | A1 | 9/2010 | Cottard |
| 2010/0278394 | A1 | 11/2010 | Raguin et al. |
| 2011/0194738 | A1 | 8/2011 | Choi et al. |

\* cited by examiner

Time = T1	Time = T2

FRAUD RESISTANT BIOMETRIC FINANCIAL TRANSACTION SYSTEM AND METHOD

CROSS-REFERENCE TO RELATED APPLICATIONS

This National Phase application is filed under Title 35 U.S.C Patents, Section 371 and claims priority on PCT Application No. PCT/US2007/080135 which is based on U.S Provisional Application 60/827,738, filed Oct. 2, 2006, all of which is hereby incorporated by reference in their entirely and upon which priority is claimed.

BACKGROUND OF THE INVENTION

This invention relates to biometric identification and authentication systems and methods, more particularly to authentication for financial transactions using biometrics.

Biometric identification and authentication systems are known in the art, for example systems to compare facial features, iris imagery, fingerprints, finger vein images, and palm vein images have been used. Such systems are known to be useful for either comparing biometric data acquired from an individual to stored sets of biometric data of known "enrolled" individuals, or to compare biometric data acquired from an individual to a proposed template such as when an identification card is supplied to the system by the individual.

Turk, et al., U.S. Pat. No. 5,164,992, discloses a recognition system for identifying members of an audience, the system including an imaging system which generates an image of the audience; a selector module for selecting a portion of the generated image; a detection means which analyzes the selected image portion to determine whether an image of a person is present; and a recognition module responsive to the detection means for determining whether a detected image of a person identified by the detection means resembles one of a reference set of images of individuals. If the computed distance is sufficiently close to face space (i.e., less than the pre-selected threshold), recognition module 10 treats it as a face image and proceeds with determining whose face it is (step 206). This involves computing distances between the projection of the input image onto face space and each of the reference face images in face space. If the projected input image is sufficiently close to any one of the reference faces (i.e., the computed distance in face space is less than a predetermined distance), recognition module 10 identifies the input image as belonging to the individual associated with that reference face. If the projected input image is not sufficiently close to any one of the reference faces, recognition module 10 reports that a person has been located but the identity of the person is unknown.

Daugman, U.S. Pat. No. 5,291,560, disclosed a method of uniquely identifying a particular human being by biometric analysis of the iris of the eye.

Yu, et al., U.S. Pat. No. 5,930,804, discloses a Web-based authentication system and method, the system comprising at least one Web client station, at least one Web server station and an authentication center. The Web client station is linked to a Web cloud, and provides selected biometric data of an individual who is using the Web client station. The Web server station is also linked to the Web cloud. The authentication center is linked to at least one of the Web client and Web server stations so as to receive the biometric data. The authentication center, having records of one or more enrolled individuals, provides for comparison of the provided data with selected records. The method comprises the steps of (i) establishing parameters associated with selected biometric characteristics to be used in authentication; (ii) acquiring, at the Web client station, biometric data in accordance with the parameters; (iii) receiving, at an authentication center, a message that includes biometric data; (iv) selecting, at the authentication center, one or more records from among records associated with one or more enrolled individuals; and (v) comparing the received data with selected records. The comparisons of the system and method are to determine whether the so-compared live data sufficiently matches the selected records so as to authenticate the individual seeking access of the Web server station, which access is typically to information, services and other resources provided by one or more application servers associated with the Web server station. If the computed distance is sufficiently close to face space (i.e., less than the pre-selected threshold), recognition module 10 treats it as a face image and proceeds with determining whose face it is (step 206). This involves computing distances between the projection of the input image onto face space and each of the reference face images in face space. If the projected input image is sufficiently close to any one of the reference faces (i.e., the computed distance in face space is less than a predetermined distance), recognition module 10 identifies the input image as belonging to the individual associated with that reference face. If the projected input image is not sufficiently close to any one of the reference faces, recognition module 10 reports that a person has been located but the identity of the person is unknown.

Different biometrics perform differently. For example, the face biometric is easy to acquire (a web camera for example) but it's ability to tell an impostor from an authentic person is somewhat limiting. In fact in most biometrics a threshold must be set which trades off how many impostors are incorrectly accepted versus how many true authentics are rejected. For example, if a threshold is set at 0 (figuratively), then no authentics would be rejected, but every impostor will also be accepted. If the threshold is set at 1 (again figuratively), no impostors will get through but neither will any authentics. If the threshold is set at 0.5 (again figuratively), then a fraction of impostors will get through and a fraction of authentics will not get through. Even though some biometrics such as the iris are sufficiently accurate to have no cross-over between the authentics and impostor distributions when the iris image quality is good, if the iris image is poor then there will be a cross-over and the problem reoccurs.

In the field of authentication of financial transactions, most systems are designed to compare biometric data from an individual to a known template rather than to a set of enrolled individuals.

However, in the field of authentication of financial transactions, high levels of accuracy and speed are critical. For example, to authenticate a banking transaction, there is high motivation for an imposter to try to spoof the system and yet the financial institution would require a fast authentication process and a low rate of false rejects or denials. In this field, even a small percentage of rejections of authentics can result in an enormous number of unhappy customers, simply because of the huge number of transactions. This has prevented banks from using certain biometrics.

In addition, informing the customer (or attempted fraudster) that they successfully got through a biometric system (or not) is not desirable because it enables fraudsters to obtain feedback on methods for trying to defeat the system. Also, there is little or no deterrent for an attempted fraudster to keep on attempting to perform a fraudulent transaction.

One problem faced by biometric recognition systems involves the possibility of spoofing. For example, a life-sized, high-resolution photograph of a person may be presented to an iris recognition system. The iris recognition systems may capture an image of this photograph and generate a positive identification. This type of spoofing presents an obvious security concern for the implementation of an iris recognition system. One method of addressing this problem has been to shine a light onto the eye, then increase or decrease the intensity of the light. A live, human eye will respond by dilating the pupil. This dilation is used to determine whether the iris presented for recognition is a live, human eye or merely a photograph—since the size of a pupil on a photograph obviously will not change in response to changes in the intensity of light.

In biometric recognition systems using fingerprint, finger vein, palm vein, or other imagery, other methods of determining whether spoofing is being attempted use temperature or other measures of liveness, the term liveness being used herein for any step or steps taken to determine whether the biometric data is being acquired from a live human rather than a fake due to a spoof attempt. More specifically however, in this invention, we define probability of liveness as the probability that biometric data has been acquired that can be used by an automatic or manual method to identify the user.

In prior biometric systems which include means and steps to determine liveness, the liveness test is conducted or carried out first, prior to the match process or matching module.

More specifically, in the prior art the decision to authorize a transaction does not separately consider a measure of liveness and a measure of match. By match step or module, we mean the steps and system components which function to calculate the probability of a match between acquired biometric data from an individual or purported individual being authenticated and data acquired from known individuals.

The prior systems and methods have not achieved significant commercial success in the field of authenticating financial transactions due, in part, from the insufficient speed and accuracy from which prior biometric authentication systems for financial transactions suffered. More specifically, the current methods of basing a decision to perform a financial transaction on the measure of match means that many valid customers are rejected, due to the finite false reject rate. There is therefore a need in this field of biometric authentication systems and methods for financial transactions for improved deterrent against attempted fraudulent transactions, and decreased rejection of valid customers.

SUMMARY OF THE INVENTION

These needs and others as will become apparent from the following description and drawings, are achieved by the present invention which comprises in one aspect a system for authenticating financial transactions comprising a mechanism for acquiring biometirc data from a person, calculating probability of livesness, Pp of the person and probability of a match, Pm, between the person and known biometric information, and providing an authenticating decision, D, based on a combination of Pp and Pm. In certain embodiments an authentication decision, D, is calculated as a function of the probability of a match Pm and the probability of a live person, Pp, according to the formula D=Pp*(K+Pm), wherein K is a number between 0.1 and 100, and in some embodiments K is a number between 0.5 and 1.5.

In another aspect, the invention comprises a method of authenticating financial transactions comprising acquiring biometric data from a person, calculating probability of liveness, Pp, of the person and probability of a match, Pm, between the person and known biometric information, and providing an authenticating decision, D, based on a combination of Pp and Pm. In certain embodiments an authentication decision, D, is calculated as a function of the probability of a match Pm and the probability of a live person, Pp, according to the formula D=Pp*(K+Pm), wherein K is a number between 0.1 and 100, and in some embodiments K is a number between 0.5 and 1.5.

In some embodiments a first image is presented on a computer screen, wherein the computer screen is oriented to face a user; at least one camera is positioned proximate the computer screen, wherein the at least one camera is oriented to face the user so that light emitted by the computer screen as the first image is reflected by the user and captured by the at least one camera; obtaining a second image through the at least one camera; and determining whether at least a portion of the second image includes a representation of the first image on the computer screen reflected by a curved surface consistent with a human eye.

In certain embodiments the probability of a live person, Pp, is calculated by presenting a first image on a computer screen positioned in front of a user; capturing a first reflection of the first image off of the user through a camera; presenting a second image on the computer screen positioned in front of the user; capturing a second reflection of the second image off of the user through the camera; comparing the first reflection of the first image with the second reflection of the second image to determine whether the first reflection and the second reflection were formed by a curved surface consistent with a human eye.

Alternatively wherein the probability of a live person, Pp, can be calculated by obtaining a first image of a user positioned in front of a computer screen from a first perspective; obtaining a second image of the user positioned in front of the computer screen from a second perspective; identifying a first portion of the first image and a second portion of the second image containing a representation of a human eye; and detecting a human eye when the first portion of the first image differs from the second portion of the second image.

The probability of a live person, Pp, is calculated in other embodiments by measuring finger or palm temperature and comparing the resultant measured temperature to expected temperature for a human.

The probability of a match, Pm, can be calculated in any way which is desired, for example by iris recognition, fingerprint image recognition, finger vein image recognition, or palm vein image recognition.

Another aspect of the invention is a system for carrying out the method.

A still further aspect and an advantage of the invention is that if a person fails or passes authentication, the person is not informed as to whether non-authentication or authentication was based on probability of liveliness or probability of matching of biometric image. This makes it much more difficult for an attempted fraudster to refine their fraudulent methods since they are not being provided clear feedback.

As compared to conventional biometric systems and methods, the invention does not merely depend on the probability that the person is who they said they are when authorizing a transaction. The invention includes calculating a second probability which is the probability that the biometric data is from a real person in the first place. The first probability is determined using any biometric algorithm. The second probability is determined using other algorithms which determine whether the biometric data or the person from whom the data is collected is a real person. The decision to authorize a transaction is now a function of both these probabilities. Often, if the first probability is high (a good match), then the second probability typically will also be high (a real person). However, in some cases where a good customer is trying to perform a transaction and the biometric algorithm is having difficulty performing a match (because light is limited for example and the person's web-cam has a low-contrast image), then the first probability could be low but the second probability could still be high.

The algorithms to determine the second probability (confidence in whether a person is real or not) can be designed to be in many cases less sensitive to conditions out of the control of the algorithms, such as illumination changes and orientation of the person, compared to algorithms that compute the first probability (confidence that the person is a particular person) which are often very sensitive to illumination changes and orientation of the person. Because of this, and since we combine the 2 probabilities to make a decision in a transaction, the reject rate of true authentics can be designed to be greatly reduced.

The invention authorizes transactions based on a combination of the two probabilities, an attempted fraudster is never sure whether a transaction was authorized or not authorized because they were matched or not matched, or because they were or were not detected as a real person and eliminates the clear feedback that criminals are provided today that they use to develop new methods to defeat systems. As a bi-product, the invention provides an enormous deterrent to criminals since the system is acquiring biometric data that they have no idea can or cannot be used successfully as evidence against them. Even if there is a small probability that evidence can be used against them is sufficient for many criminals to not perform fraud, in consideration of the consequences of the charges and the damming evidence of biometric data (such as a picture of a face tied to a transaction). An analogy to this latter point is CCTV cameras located in a public environment, which typically reduces crime substantially since people are aware that there is a possibility they will be caught on camera.

A preferred formula used in calculating a decision whether to authenticate a transaction is $D=P(p)*(1+P(m))$, where D is the decision probability, P(m) is the probability of a match with a range of 0 to 1, and P(p) is the probability the person is real and the biometric data is valid from 0 to 1. If the algorithm detects person is not live, and no match detected: $D=0*(1+0)=0$. If the algorithm detects strongly that the person is live, and yet no match is detected: $D=1*(1+0)=1$. If the algorithm detects strongly that the person is live, and a very good match is detected: $D=1*(1+1)=2$. If the algorithm detects strongly that the person is live (or more specifically, that biometric data has been collected that can be used by a manual or automatic method after-the-fact to identify the person in prosecution for example), and a poor match is detected of 0.3: $D=1*(1+0.3)=1.3$ If the threshold is set at, for example, 1.2 for D, then essentially in the latter case, the transaction will be authorized even though the biometric match is not high. This is because the system determined that the biometric data collected can be used by a manual or automatic method after-the-fact to identify the person in prosecution for example. A higher transaction may be authorized if the value of D is higher. Many other functions of Pp and Pm can be used. We use the parallel result to authorize a transaction or access control or other permission, where rejection of a true customer has significant penalty such as a loss of a customer. In the prior art, false rejects and true accepts are often addressed only in consideration of the biometric match performance, and the substantial business consequences of a false reject is often not considered, and therefore few systems have been implemented practically.

A special advantage of this method and system is that by combining in one algorithm the live-person result with the match result, a fraudulent user does not know whether he or she was authorized or declined as a result of a bad or good match, or because the system has captured excellent live-person data that can be used for prosecution or at least embarrassing public disclosure. The system results in a large deterrent since in the process of trying to defeat a system, the fraudulent user will have to present some live-person data to the system and they will not know how much or how little live-person data is required to incriminate themselves. The fraudulent user is also not able to determine precisely how well their fraudulent methods are working, which takes away the single most important tool of a fraudster, i.e., feedback on how well their methods are working. At best, they get feedback on the combination of live-person results and match results, but not on either individually. For example, a transaction may be authorized because the probability of a live-person is very high, even if the match probability is low. The invention collects a set of live-person data that can be used to compile a database or watch list of people who attempt to perform fraudulent transactions, and this can be used to recognize fraudsters at other transactions such as check-cashing for example by using a camera and another face recognition system. The system also ensures that some live-person data is captured, then it provides a means to perform customer redress (for example, if a customer complains then the system can show the customer a picture of them performing a transaction, or a bank agent can manually look at the picture of the user performing the transaction and compare it with a record of the user on file).

The biometric data gathered for calculating Pp can be stored and used later for manual verification or automatic checking.

In the prior art, only Pm has been involved in the decision metric. According to the present invention, Pp is combined so that for a given Pm, the decision criteria, D, is moved toward acceptance compared to when only Pm is involved if Pp is near 1, so that if the system has acquired good biometric data with sufficient quality for potential prosecution and manual or automatic biometric matching, then it is more likely to accept a match based on given biometric data used to calculate Pm, thereby moving the performance of a transaction system for authentic users from 98 percent to virtually 100 percent while still gathering data which can be used for prosecution or deterrent.

DETAILED DESCRIPTION

Figure 1:
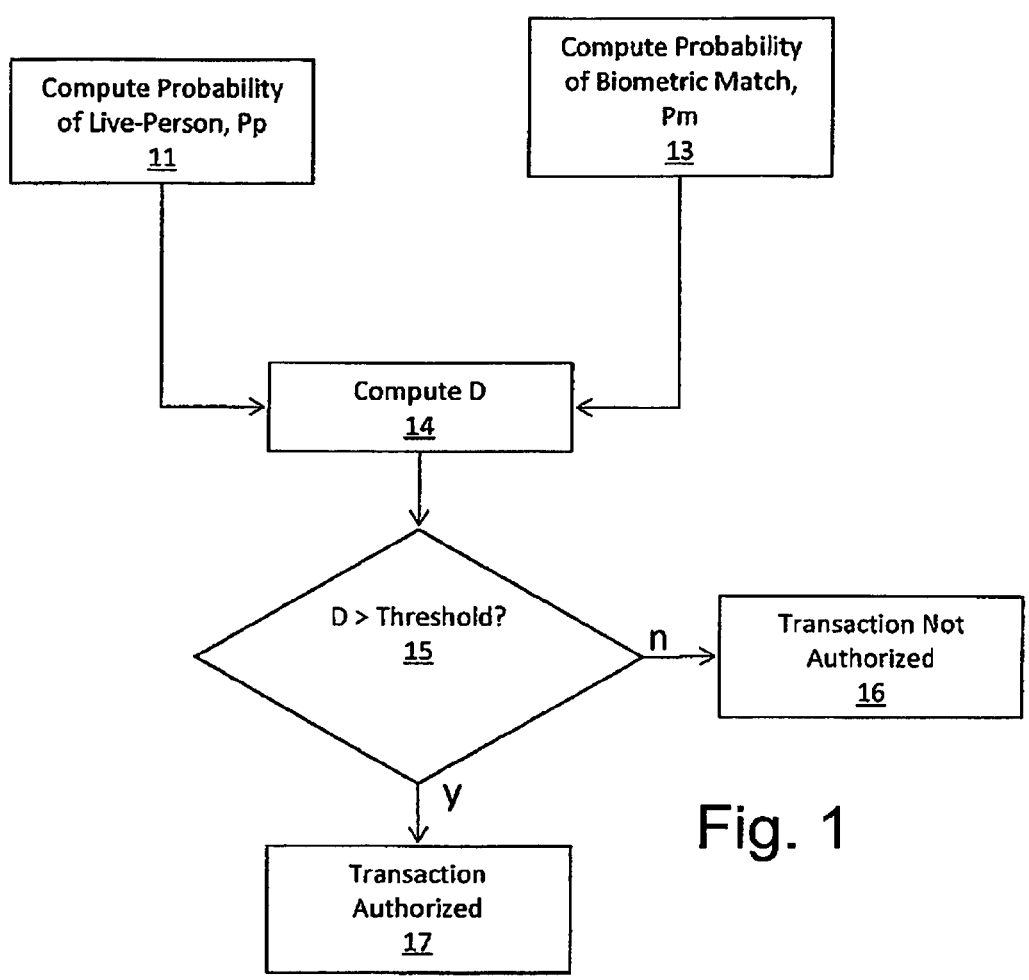
FIG. 1 is a flow chart of an authentication system according to the invention.

Referring first to FIG. 1, the overall process is to compute 11 the probability, Pp, of a live person being presented, compute 13 the probability of a biometric match, Pm, computing 14 D according to the aforementioned formula, wherein at decision block 15 if D exceeds a preset threshold, the transaction is authorized 17 or, if D does not exceed the preset threshold, the transaction is not authorized, 16.

Figure 2:
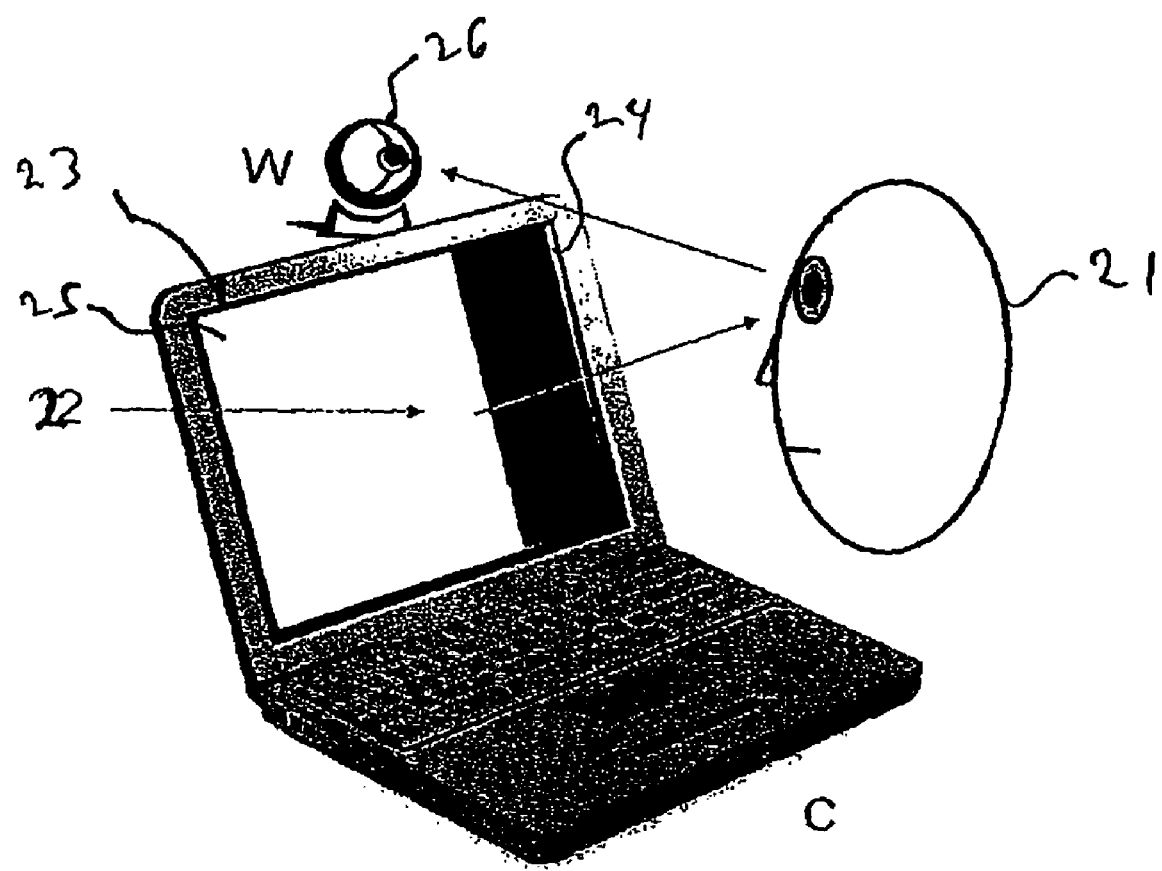
FIG. 2 is a schematic view of an aspect of the system for detecting the presence of a live person attempting a financial transaction.

Referring now to FIG. 2, an example of a system and method of obtaining data used for calculating the probability of a live person 21 is shown. First, an image is displayed on a screen 23 with a black bar 24 on the right and a white area 25 on the left, and an image from a web-camera 26 that the person 21 looks at is recorded. A second image is displayed on the screen (not shown), but this time the black bar is on the left and the white area is on the right and a second image from the web-camera 26 is recorded.

The difference between the two images is recorded and the difference at each pixel is squared. The images are then blurred by convolving with a low-pass filter and then threshold the image. Areas above threshold are areas of change between the two images. The system expects to see a change primarily on the cornea, where a sharp image of the screen is reflected.

Figure 3:
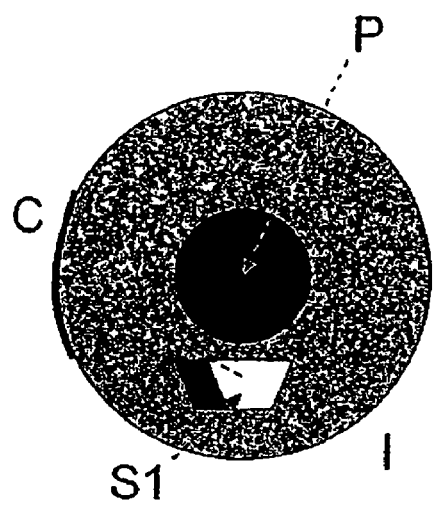
FIG. 3 and 4 are front views of the picture of an indivdidual's iris and pupile of a single eye taken at spaced time intervals, as a function of different reflected light onto the eye from the computer monitor and a schematic repersentation of the image on the eye.
Figure 4:
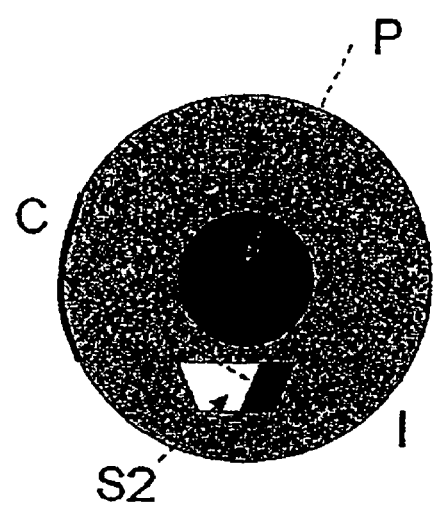

Referring to FIGS. 3 and 4 which represent cornea C with pupil P and section S1 at time T1 and S2 at time T2, with I representing an iris, given the curved geometry of the cornea, for a live curved and reflective cornea, the black and white area should have a particular curved shape—specifically a curved black bar and a curved white area (much like a fish-eye lens view). A template of the expected view is correlated with the first image obtained on the web-camera only in the region of the eye as detected by the prior step), and the peak value of the correlation is detected. The process is then repeated with the template expected from the second image.

The minimum of the two correlation scores (which will lie between −1 to 1) is correlated and normalized it to be between 0 and 1 by adding 1 and dividing by 2. This is the probability of measure of liveness=P(p).

Using the method described in Turk, et al., U.S. Pat. No. 5,164,992, a face recognition match score, Pm, is calculated and then normalized to be between 0 and 1.

The system then computes D=(P(L)*(1+P(M))/2. If P(L) ranges from 0 to 1, and P(M) ranges from 0 to 1, then D ranges from 0 to 1. A threshold of 0.55 is set. If the value of D for a particular transaction/customer is above 0.55, then the transaction authenticated and allowed to proceed. If the value of D is less than or equal to 0.55, then authentication fails and the transaction is not allowed to proceed. If P(L)=0.95 (high) and P(M)=0.95 ((high), then D=0.95, which is well above the threshold—the transaction goes through as expected. If P(L) =0.95 (high), but P(M)=0.25 (poor), then D=0.6, and the transaction still goes through.

A method for determining the quality of the acuired data for prosecution or biometric matching, in an example where the biometric is the face, is (i) Perform face detection using the methods described in, for example, M. Turk, A. Pentland, Eigenfaces for Recognition, Journal of Cognitive Neuroscience, Vol. 3, No. 1, 1991, pp.77-86, and (ii) Measure the distance between the eyes in image pixels, using the X,Y location of each eye which are returned from the face detection moudle, and by ensuring that the distance between the eyes is at least 100 pixels, which is the recommended resolution in the ANSI/INCITS 385-2004 standard can be chosen.

Figure 5:
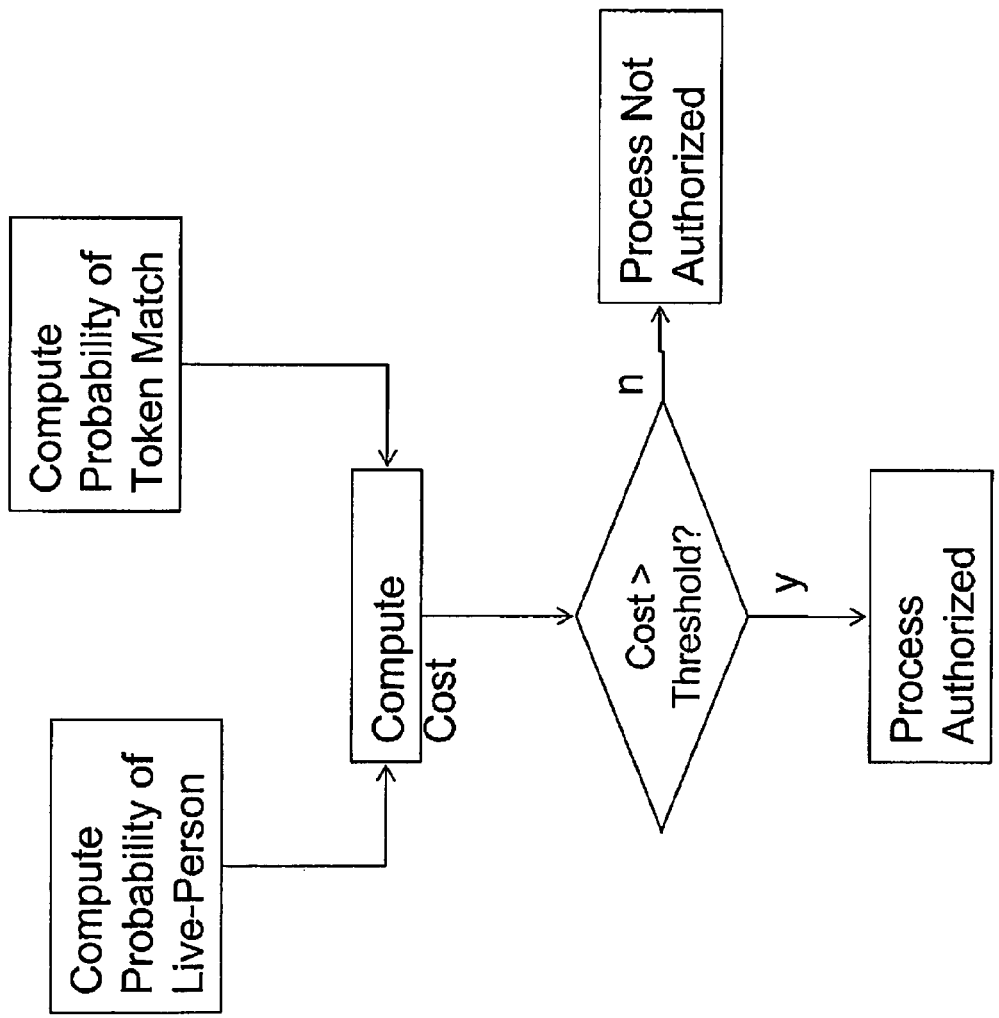
FIG. 5 is a flow chart of another embodiment of the present invention showing the use of a token for use in the financial authentication system.

FIG. 5 shows a verison of the system that similarly computes the probability of a live person and acquires biometric data that can be used later for prosecution and matching using manual and more complex automatic techiques. However, rather than use the probability of a biometric macth for the second probability, the probability that a token (such as a card swipe) and/or personal identification number (PIN) is used instead. While it may appear that this probability will be 0 or 100%(the PIN number is entered correctly or not), from the transactional viewpoint the PIN number or card swipe may be stolen, so that the probability that the card holder is present at the machine is less than 100% even of a PIN number is entered correctlt. This probability can be derived from the statistics of crime at the particular transactional systems being used. For example, if one fraudulent transaction occurs for every one hundred transactions, then the probability that the token is vaild is 99% from a statistical veiwpoint. In this sysetm, even if a PIN number is entered correctly, a transaction will not be authorized unless the probability that the person is live and that the biometric data acquired has sufficient qualty for use later in prosecution and matching using manual or automatic techniques, is sufficiently high.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method of authenticating financial transactions comprising acquiring biometric data from a person, calculating probability of liveness, Pp, of the person and probability of a match, Pm, between the person or a token and known biometric or token information respectively, determining a combination of Pp and Pm that emphasizes the contribution of Pp to the combination, and providing an authentication decision, D, based on the determined combination of Pp and Pm.

2. The method of claim 1 wherein an D is calculated as a function of Pm and Pp according to the formula D=P(p)*(K+ P(m)), wherein K is a number between 0.1 and 100.

3. The method of claim 1 wherein an authentication decision, D, is calculated as a function of Pm and Pp according to the formula D=P(p)*(K+P(m)), wherein K is a number between 0.5 and 1.5.

4. The method of claim 1 wherein the biometric data is stored and is used for manual verification.

5. The method of claim 1 wherein Pp is determined by steps comprising presenting a first image on a computer screen, wherein the computer screen is oriented to face a user; positioning at least one camera proximate the computer screen, wherein the at least one camera is oriented to face the user so that light emitted by the computer screen as the first image is reflected by the user and captured by the at least one camera; obtaining a second image through the at least one camera; and determining whether at least a portion of the second image includes a representation of the first image on the computer screen reflected by a curved surface consistent with a human eye.

6. The method of claim 1 wherein Pp is calculated by steps comprising presenting a first image on a computer screen positioned in front of a user; capturing a first reflection of the first image off of the user through a camera; presenting a second image on the computer screen positioned in front of the user; capturing a second reflection of the second image off of the user through the camera; comparing the first reflection of the first image with the second reflection of the second image to determine whether the first reflection and the second reflection were formed by a curved surface consistent with a human eye.

7. The method of claim 1 wherein Pp is calculated by steps comprising obtaining a first image of a user positioned in front of a computer screen from a first perspective; obtaining a second image of the user positioned in front of the computer screen from a second perspective; identifying a first portion of the first image and a second portion of the second image containing a representation of a human eye; and detecting a human eye when the first portion of the first image differs from the second portion of the second image.

8. The method of claim 1 wherein Pp is calculated by steps comprising presenting one or more illuminators, wherein the illuminators are oriented to face a user; positioning at least one camera proximate the illuminators, wherein the at least one camera is oriented to face the user so that light emitted by the illuminators is reflected by the user and captured by the at least one camera as a first image; obtaining a second image through the at least one camera at a different time than the first image; detecting a first position of a reflection in the first image and a second position of a reflection in the second image; normalizing a positional change of the user in the first image and the second image based upon the first position and the second position, wherein the step of normalizing comprises compensating for motion during the time between the first image and the second image by using at least a translation motion model to detect residual motion of the position of the reflection; and determining whether a change between at least a portion of the first image and the second image is consistent with reflection by a curved surface consistent with that of a human eye.

9. The method of claim 1 wherein Pp is calculated by steps comprising measuring finger or palm temperature and comparing the resultant measured temperature to expected temperature for a human.

10. The method of claim 1 wherein Pm is calculated by steps comprising iris recognition, fingerprint image recognition, finger vein image recognition, or palm vein image recognition, face recognition, or token match.

11. The method of claim 1 wherein if a person fails authentication, the person is not informed as to whether non-authentication was based on probability of nonliveliness or probability of non-matching of biometric image.

12. The method of claim 1 wherein the accuracy of authentication of an authentic person is improved by the use of Pp.

13. The method of claim 1 wherein biometric data used to calculate Pp is obtained from a web camera connected to a computer.

14. The method of claim 1 wherein biometric data used to calculate Pp is obtained from a cell phone camera.

15. A method of authenticating financial transactions comprising acquiring biometric data from a person, calculating probability of liveness, Pp, of the person and probability of a match, Pm, between the person or a token and known biometric or token information, and providing an authentication decision, D, based on a combination of Pp and Pm, wherein D is calculated as a function of Pm and Pp according to the formula $D=P(p)*(K+P(m))$, wherein K is a constant.

16. A system for authenticating financial transactions comprising means to acquire biometric data from a person and calculate probability of liveness, Pp, of the person and probability of a match, Pm, between the person or token and known biometric or token information, determine a combination of Pp and Pm that emphasizes the contribution of Pp to the combination, and provide an authentication decision, D, based on the determined combination of Pp and Pm.

17. The system of claim 16 wherein the means to calculate comprises a computer programmed to determine Pp, Pm, and to authenticate if the value of D exceeds a predetermined value according to a formula $D=P(p)*(K+P(m))$, wherein K is a number between 0.1 and 100.

18. The system of 16 wherein the means to calculate comprises a computer programmed to determine Pp, Pm, and to authenticate if the value of D exceeds a predetermined value according to a formula $D=P(p)*(K+P(m))$, wherein K is a number between 0.5 and 1.5.

19. The method of claim 1, comprising moving the authentication decision towards acceptance if Pp comprises a value that is near to 1.

20. The method of claim 1, comprising authenticating the person if Pp comprises a value that is near to 1, and Pm comprises a value of about 0.25 or greater.

21. The method of claim 1, comprising authenticating the person if Pp and Pm are above a threshold, authenticating the person if Pp is above the threshold and Pm is below the threshold, and not authenticating the person if Pp and Pm are below the threshold.

* * * * *